Dec. 19, 1939.  G. C. BLAKE ET AL  2,184,175
BUFFING MACHINE
Filed Dec. 6, 1937  6 Sheets-Sheet 1

INVENTORS
GEORGE C. BLAKE &
PERCIVAL C. SMITH
BY Spencer Hardman & Fehr
their ATTORNEYS

Fig.2

Dec. 19, 1939. G. C. BLAKE ET AL 2,184,175
BUFFING MACHINE
Filed Dec. 6, 1937 6 Sheets-Sheet 3

Fig. 3

INVENTORS
GEORGE C BLAKE &
PERCIVAL C SMITH
BY *Spencer Hardman & Fehr*
their ATTORNEYS Dec. 19, 1939.  G. C. BLAKE ET AL  2,184,175
BUFFING MACHINE
Filed Dec. 6, 1937  6 Sheets-Sheet 5

INVENTORS
GEORGE C. BLAKE &
BY PERCIVAL C. SMITH
Spencer Hardman & Fehr
their ATTORNEYS Dec. 19, 1939.　　　G. C. BLAKE ET AL　　　2,184,175
BUFFING MACHINE
Filed Dec. 6, 1937　　　6 Sheets-Sheet 6

INVENTORS
GEORGE C. BLAKE &
PERCIVAL C. SMITH
BY Spencer Hardman & Fehr
their ATTORNEYS Patented Dec. 19, 1939

2,184,175

UNITED STATES PATENT OFFICE 2,184,175

BUFFING MACHINE

George C. Blake, Syracuse, N. Y., and Percival C. Smith, Anderson, Ind., assignors to General Motors Corporation, Detroit, Mich., a corporation of Delaware Application December 6, 1937, Serial No. 178,258

24 Claims. (Cl. 51—97)

This invention relates to a buffing machine for polishing curved objects such as hub caps for the wheels of automotive vehicles. More particularly the invention relates to polishing machines in which a rotating buffing wheel is caused to engage the surface of a rotating work piece, the axis of which is caused to oscillate in order to bring all parts of the surfaces of the work piece into engagement with the buffing wheel.

One of the objects of the present invention is to provide for the operation of such machines in groups or gangs in a manner such that a common shaft can be provided for trans-rotary motion to a plurality of workholders, each of which can be oscillated while it is rotating. In this connection, it is a further object to provide a common cam device for effecting the oscillation of the plurality of workholders while they are being rotated.

A further object of the invention is to provide a simple and conveniently operable latching device for maintaining a buffing wheel in engagement with a work piece.

Further objects are to provide a simple and easily operated device for clamping the work piece upon the workholder while permitting it to be rotated and oscillated. In this connection, it is a further object to provide a work securing means which is readily adapted to cooperate with work pieces and workholders of various sizes within certain limits.

It will be understood that the present invention aims to make it possible for one operator to attend to at least two groups or gangs of buffing machines. While one gang of buffing machines is in operation, the operator may readily unload and reload the workholders of another gang of machines.

Further objects and advantages of the present invention will be apparent from the following description, reference being had to the accompanying drawings wherein a preferred embodiment of the present invention is clearly shown.

Figure 1:
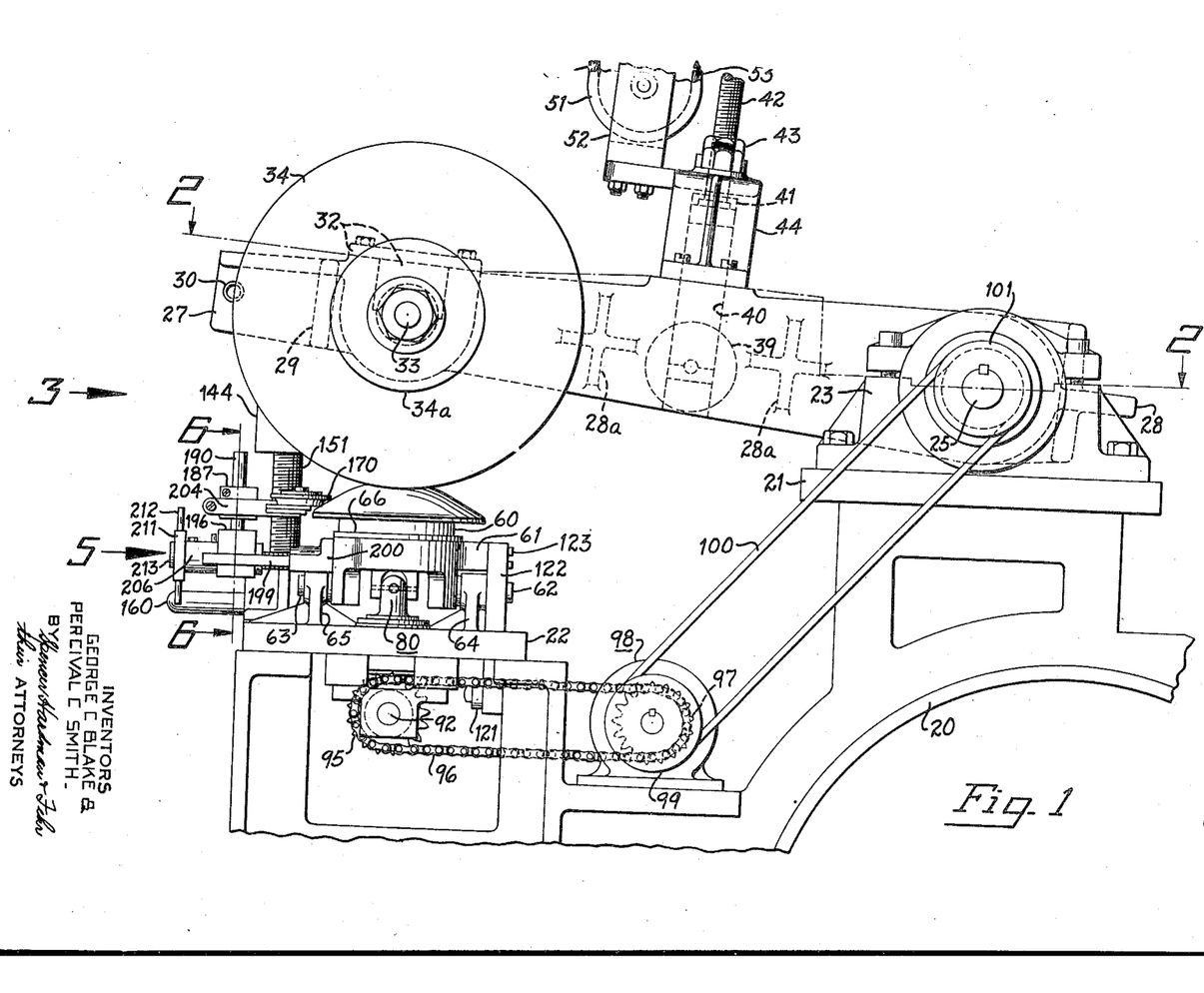
Fig. 1 is a fragmentary side view of a polishing unit embodying the present invention.
Figure 2:
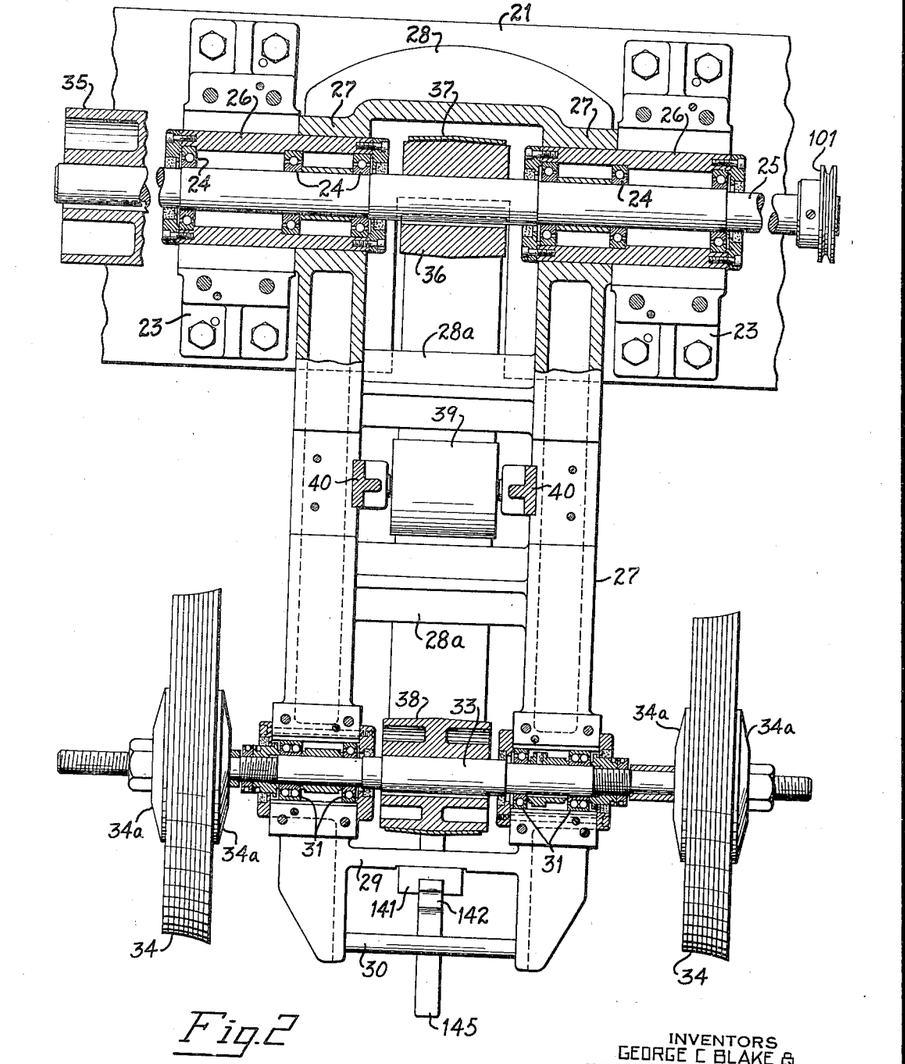
Fig. 2 is a plan view partly in section, the section being taken on the line 2—2 of Fig. 1.
Figure 3:
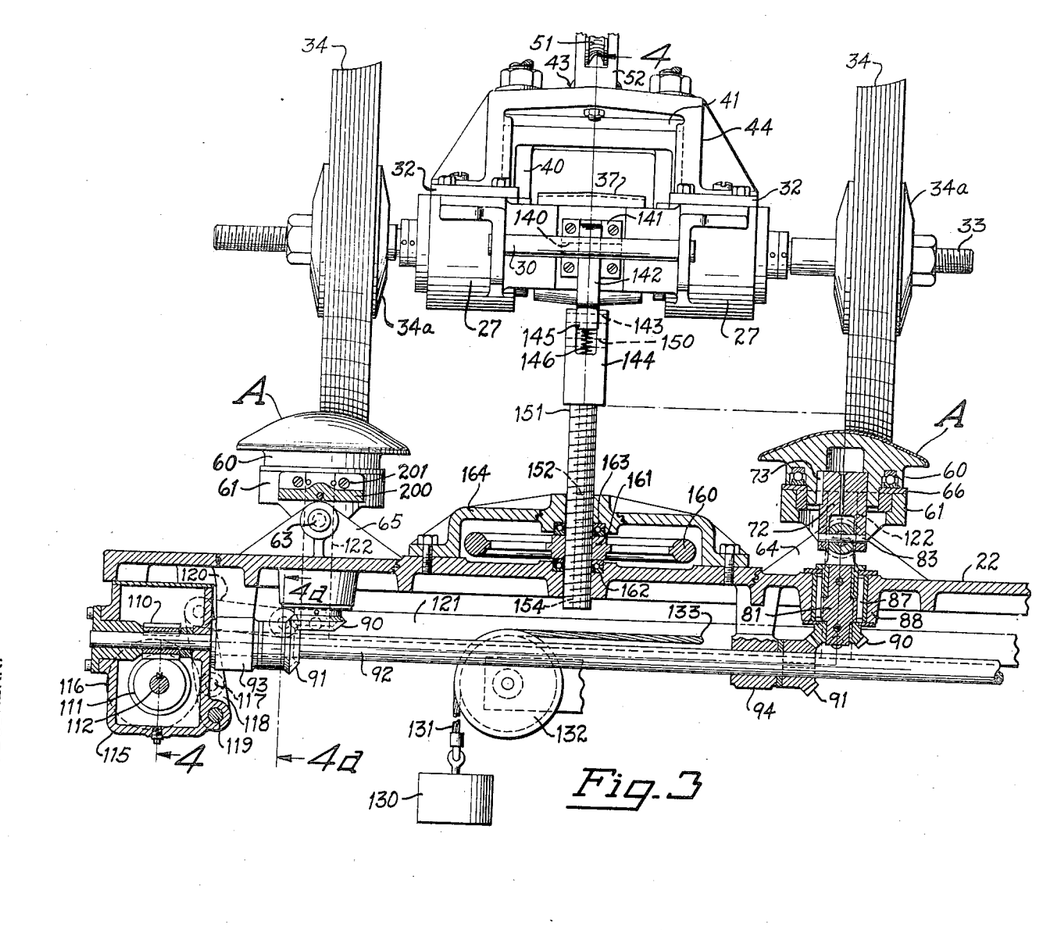
Fig. 3 is a fragmentary front elevation partly in section, this view being taken generally in the direction of the arrow 3 of Fig. 1.

Referring to Fig. 1 numeral 20 designates one of a plurality of vertical frames which are tied together by means of horizontal supports or tables 21 and 22. The table 21 supports a plurality of bearing assemblies 23 which are arranged in pairs and which carry the antifriction bearings 24 for a shaft 25. Since the buffing apparatus may consist of several units such as shown in Figs. 1, 2 and 3, it will be understood that the shaft 25 may extend from one group of bearing assemblies 23 to another such group of bearing assemblies. The shaft may be continuous or in sections connected together by suitable couplings. The tables 21 and 22 will preferably be in sections bolted together.

Each bearing assembly 23 includes a cylindrical sleeve 26 upon which is journaled an arm 27, the two sleeves 26 of each unit provides supports for arms 27 of a buffing wheel frame. These arms are connected in the rear by a yoke 28, intermediately by cross bars 28a and at the front by a cross plate 29 and a rod 30. Near the front the arms 27 are shaped so as to provide for the reception of antifriction bearings 31 which are removably held in place by bearing caps 32 shown in Figs. 1 and 3. The bearings 31 support a shaft 33 carrying buffing wheels 34.

The shaft 25 is driven by a suitable electric motor not shown, through a belt, not shown, which engages a pulley 35 attached to the left end of shaft 25. Shaft 25 carries a pulley 36 connected by a belt 37 with a pulley 38 connected with shaft 33. Belt 37 is maintained in a taut condition by a belt tightener wheel 39 having a bearing in a frame 40, the upper end of which is provided with a yoke 41 attached to a threaded stem or rod 42. The belt 37 is maintained taut by the weight of members 39, 40, 41 and 42, the effect of this weight upon the belt 37 being adjusted by the turning of a nut 43 threaded on the rod 42. The weight of the buffing wheels and their supporting shaft and frame is counterbalanced by a suitable weight, not shown. It is to be understood however that this weight is connected with a cable 50, a fragment of which is shown in Fig. 1. One end of the cable 50 is attached to a fixed support and the cable passes around a pulley 51 journaled in a bracket 52 which is attached to the support 44 which carries the belt tightener. The weight is so arranged and connected with the cable 50 as to cause the cable to be pulled upwardly as indicated by the arrowhead 53 in Fig. 1. The mass of the weight is such as to urge the frame arm 27 upwardly or in a clockwise direction as viewed in Fig. 1.

Each buffing machine unit comprises two buffing wheels 34 which simultaneously operate upon work pieces A as shown in Fig. 3. Each work piece A rests upon a workholder block 60 which is supported for rotation and oscillation by a cradle 61. Cradle 61 is secured to pivot pins 62 and 63 which rock in bearing brackets 64 and 65 respectively formed integral with the table 22. Cradle 61 carries a bearing 66 having a central bore 67 for receiving the hub 68 of the work support 60. In this way the bearing 66 provides a cylindrical journal for the workholder 60. The bearing 66 has a plane surface 69 which receives a step or thrust bearing 70 which provides vertical support for the work holder block 60.

The block 60 is provided with a center cylindrical bore 71 which slidably receives a short shaft 72 to which is attached a key 73 received by a groove 74 provided by the block 60 and opening from the center bore 71 thereof. In this way the block 60 can be readily detached from the shaft 72 and a different block 60 substituted therefor, the difference being in the shape and size of the work-supporting surface of the block. Each block 60 may carry its own thrust bearing 70 so that the bearing 70 remains with the block 60 as one block is removed from the cradle bearing 66 and another substituted.

The short shaft 72 is connected by a universal joint 80 with a shaft 81. The universal joint 80 comprises arms 82 integral with shaft 72 and connected by a cross pin 83 with a cross pin 84 carried by arms 85 integral with a hub 86 pinned to the shaft 81. The shaft 81 and the hub 86 are journaled in a roller bearing 87 located within a hollow boss 88 provided by the table 22. The universal joint pin 83 is located at its axis at right angles to and intersecting the axis of pin 84. The axis of pin 84 rotates in a plane which includes the axes of the cradle pivot pins 62 and 63. Thus, the cradle 61 is pivoted coaxially with the universal joint 80.

Figures 4, 4A:
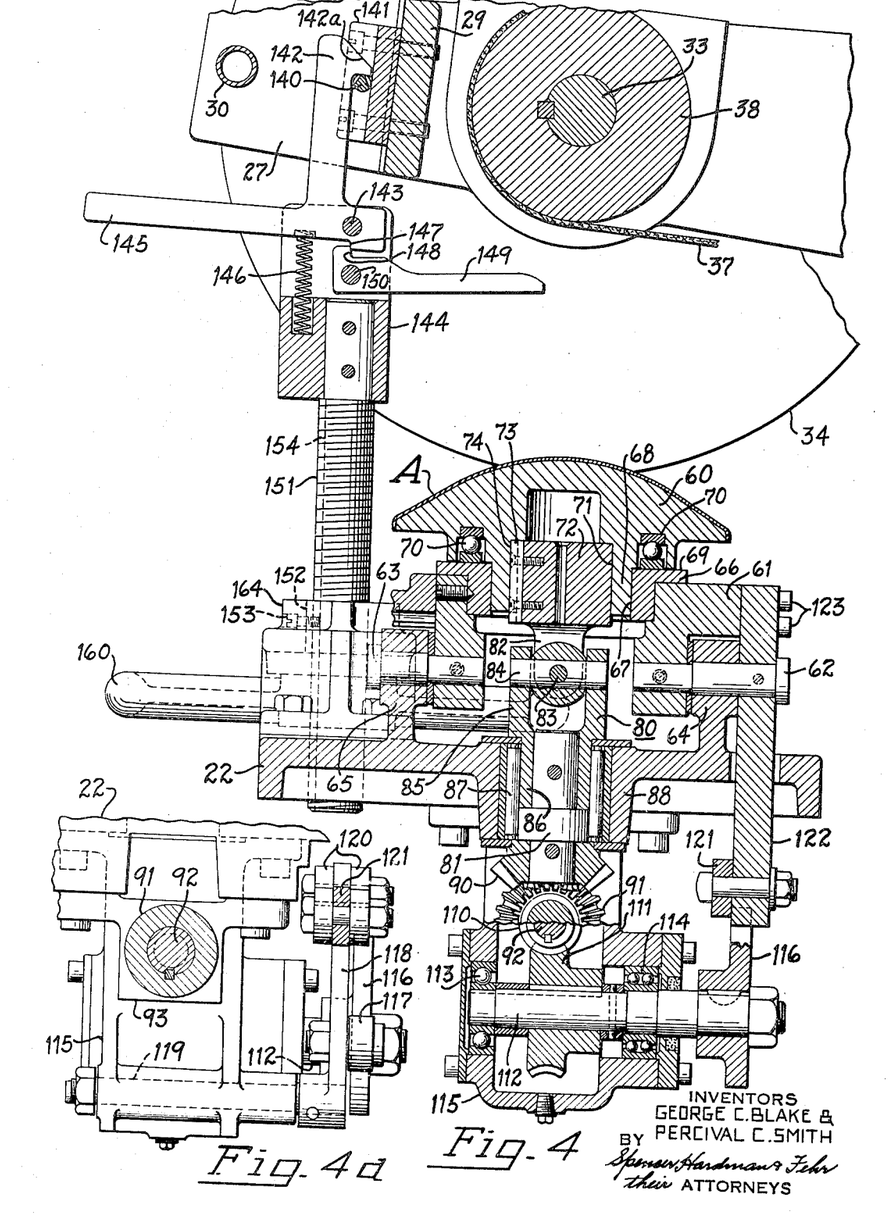
Fig. 4 is a fragmentary sectional view drawn to a larger scale than the preceding figures and taken on the section line 4—4 of Fig. 3.
Fig. 4a is fragmentary front elevation of some of the parts shown in Fig. 4. This view is partly in section, the section being taken on the line 4a—4a of Fig. 3.

Shaft 81 carries a bevel gear 90 which, as shown in Fig. 4, meshes with a bevel gear 91 carried by a shaft 92 rotatably supported by the bearing brackets 93 and 94 (see Fig. 3) which are suspended from the table 22.

As shown in Fig. 1, shaft 92 carries a sprocket gear 95 which meshes with a sprocket chain 96, meshing with a sprocket gear 97 provided by gear reduction unit 98 which is driven by a pulley 99. Pulley 99 receives a belt 100 which is received by driving pulley 101 connected with shaft 25 as shown in Figs. 1 and 2. The shaft 25 is rotated preferably at 1800 R. P. M., and the buffing wheel shaft is preferably driven at that speed. The reduction gear unit 98 provides an eighty to one gear reduction and the shaft 92 is caused to rotate at 22.5 R. P. M. Hence, the work piece A rotates relatively slowly while the buffing wheels rotate at relatively high speed.

The work supports 60 of the buffing units are caused to oscillate by common mechanism which comprises the following elements which will now be described: Shaft 92 drives a worm 110 which meshes with a worm wheel 111 carried by shaft 112 as shown in Figs. 3, 4 and 4a. Shaft 112 is supported within a gear case 115, the side walls of which carries antifriction bearings 113 and 114. Outside the case 115 the shaft 112 carries a cam 116 which is in the form of a disc located eccentrically on the shaft 112. The eccentric disc or cam 116 engages a roller 117 supported by a lever 118 pivoted on a stud 119 carried by the gear box 115. Lever 118 is connected by links 120 with a bar 121 which is connected together with a plurality of levers 122, there being one lever 122 associated with each of the work holders. Each lever 122 is pivotally supported by the shaft 62 and is connected with the cradle 61 by screw 123. Hence, the single cam 116 cooperating with roller 117, lever 118, links 120 and bar 121, effects the rocking of a plurality of cradles simultaneously. The cam or eccentric disc 116 urges the bar 121 toward the right, as viewed in Fig. 3, said bar being urged toward the left by a weight 130 attached to a cable 131 passing around a guide wheel 132 and anchored at 133 to the bar 121.

These buffing wheel units may be conveniently grouped together in gangs of three units thus providing six buffing wheels and six work supports in each gang. A single operator may control the operation of two such gangs. While one gang of buffing machines operates upon six work pieces at the same time, the operator may, with great facility, stop the other gang of machines and unload and reload and start again.

Each pair of buffing wheels may be conveniently latched in position by an adjustable latching device which will now be described: One element of the latching device is a latch rod 140 of hardened metal carried by bracket 141 attached to the cross plate 29 which connects the free ends of the buffing wheel frame arms 27. The other element of the latch is the latch lever 142 pivotally mounted upon a pin 143 carried by a bracket 144 and provided with a handle 145. The lever 142 is urged in a clockwise direction in Fig. 4 by spring 146 interposed between the lever 142 and the bracket 144. Clockwise rotation of the lever 142 is limited owing to the fact that it has a shoulder 147 cooperating with a lug 148 provided by a lever 149 pivoted at 150 upon the bracket 144. To release the buffing wheels 34 from the work pieces A, the operator pulls the lever handle 145 down to cause the latch 142 to release the bar 140. The buffing wheel frame 27 then swings upwardly due to the counterbalance which effects an upward pull on the cable 50 shown in Fig. 1 as indicated by the arrowhead 53. To bring the buffing wheels into engagement with the work, the operator pulls down on the handle bar 30 which causes the latch bar 140 to engage the inclined surface 142a of the latch 142, thereby camming it outwardly toward the left in Fig. 4 so as to permit the bar 140 to pass below the nose of the latch, whereupon the latch is urged by the spring 146 into the latching position shown in Fig. 4.

It is necessary to adjust the latch to various heights on account of variations in the diameters of the buffing wheels. The two buffing wheels 34 of each unit are renewed at the same time. As they wear away, it is necessary to lower the latching mechanism and this is done by turning a hand wheel 160, a hub of which provides a nut 161 confined between thrust bearings 162 and 163 located respectively upon the table 22 and a bracket 164 attached thereto. The nut 161 cooperates with a screw 151 attached to the bracket 144. The screw 151 is prevented from turning by means of a key 152 which is attached by screw 153 to the bracket 164 and which is received by a groove 154 provided by the screw 151. Since the nut 161 cannot move vertically when the hand wheel 160 is turned and, since the screw 151 cannot turn, said screw 151 must move vertically. Thus, by turning the hand wheel 160, the bracket 144 may be raised or lowered to suit the requirements of the machine and to adjust the buffing wheels 34 to the work pieces A.

As the buffing wheels wear away, they are still serviceable until a certain minimum diameter is reached. It is apparent from Figs. 3 and 4 that the lowering of the latch 142 is limited by the bracket 144 striking the upper surface of the bracket 164. The necessity for lowering the bracket 144 until it engages the bracket 164 would be occasioned only by the wearing away of the buffing wheels 34 to such a distance that very little of the buffing cloth extending beyond the periphery of the clamping disc 34a as shown in Fig. 2. To prevent lowering the buffing wheel frame still lower thus causing the buffing wheel clamping disc to engage the work and spoil it, a stop device is provided. This stop device is provided by the lever 149 as shown in Fig. 4, which is engaged by the belt 37 which passes around the pulley 38. As the frame is pushed downwardly, the belt engages the lever 149 and pushes it downwardly against the bracket 144, at the same time the latch 142 is caused to swing counterclockwise due to the coaction of the lug 148 of the lever 149 with the shoulder 147 of the lever 142. Therefore, the latch is so moved that it will not hold the latch bar 140 in this position of the frame 27. The failure of the latch mechanism to maintain the buffing wheel frame in such position as to cause the buffing wheels to engage the work while the buffing wheel clamping discs are dangerously close to the work, indicates to the operator that it is time to renew the buffing wheel.

The means for retaining work pieces upon the work supports will now be described with reference to Figs. 5 to 9 and Fig. 1: Referring more particularly to Fig. 7 in which a work piece A is shown mounted upon a work supporting block 60, it will be seen that a pair of soft rubber rollers 170 are caused to move into position shown at 170a by dot-and-dash lines. These rollers being rotatable and being supported upon a bracket 200 which is attached to the cradle 61, the work piece A is retained upon its support 60 while being rotated and oscillated. Each roller 170 is fastened to a hub 171 and is clamped against a flange 172 of the hub by nut 173 threaded upon the hub. The hub 171 is journalled by an antifriction bearing 174 upon a stub shaft 175 having a threaded shank 176 passing through an arm 177b and secured thereto by nut 178. As the roller 170 receives an upward thrust when in work engaging position, the flange 172 is backed up by a ball thrust bearing 179 retained by a screw 180 threaded into the stub shaft 175. The two arms 177a and 177b are clamped together in a desired position of adjustment by a clamp screw 194 having a shank which passes through a plane hole in the upper arm 177b in Fig. 9 and is threadedly engaged by the lower arm which is numbered 177a. By unscrewing the screw 194 from the arm 177a, the two arms 177a and 177b may be located in the desired angular relation with respect to the screw 194 in order to accommodate the rollers 170a and 170b to the work piece. After this adjustment has been made, the screw 194 is tightened to clamp the two arms 177a and 177b together. The screw 194 serves to pivotally support both arms 177a and 177b upon a bracket 204, the right end of which is horizontally notched to provide lugs or ears 181 and 182. As viewed in Fig. 9 the left hand ear 181 has a running fit with the head of the screw 194 and the screw 194 has a reduced shank portion 194a which has a running fit in a plain hole provided by the right hand ear 182. Thus, the screw 194 provides a pivot for the arms 177a and 177b upon the bracket 204.

Figure 5:
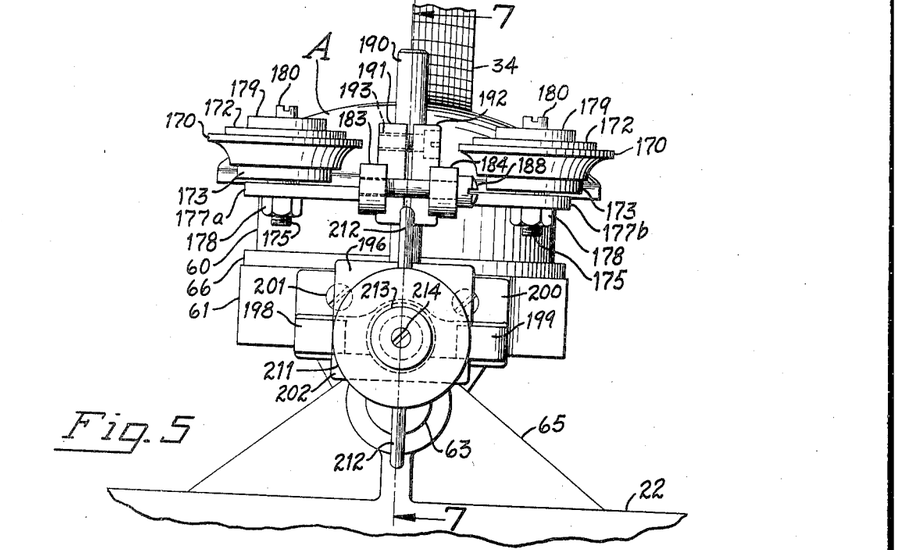
Fig. 5 is a fragmentary front elevation of one of the work clamps. It is drawn to a larger scale than Fig. 1 and is taken in the direction of the arrow 5 of Fig. 1.
Figure 6:
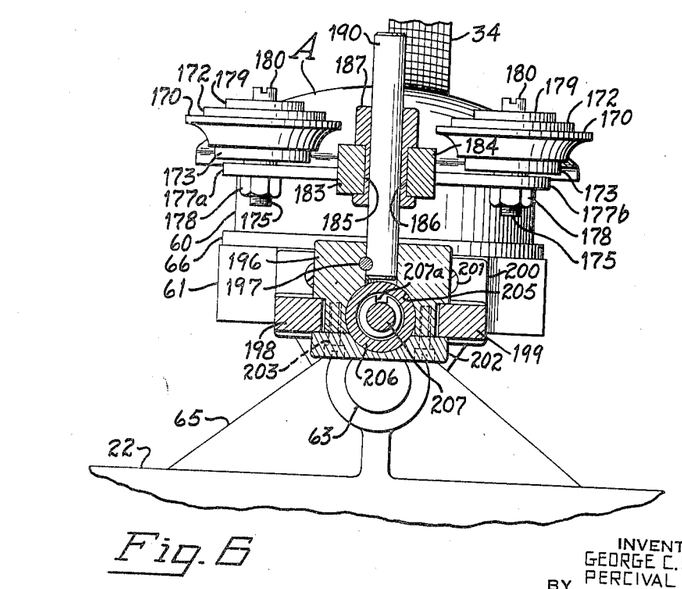
Fig. 6 is a view similar to Fig. 5, but is partly in section, this section being taken on the line 6—6 of Fig. 1.
Figure 7:
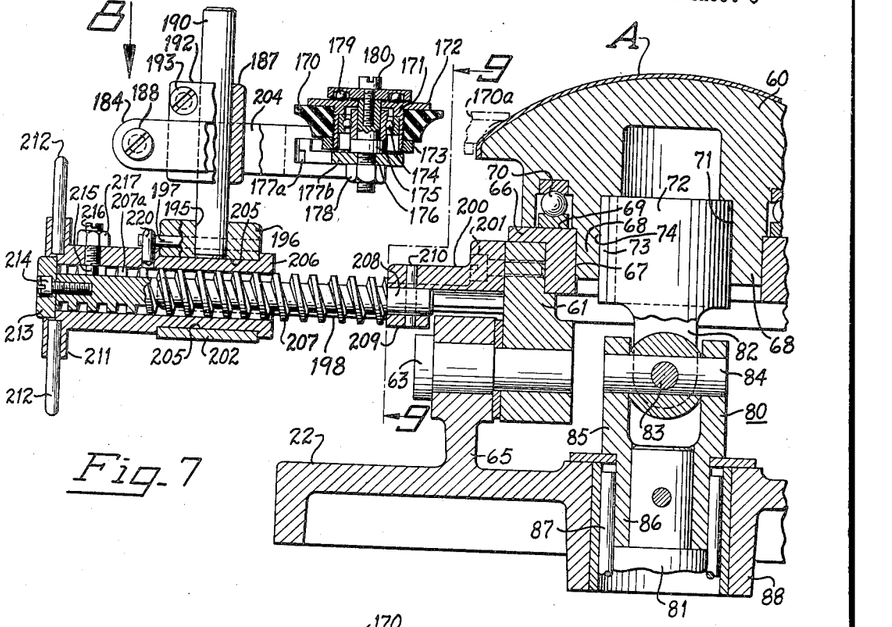
Fig. 7 is a sectional view taken chiefly on the line 7—7 of Fig. 5. One of the work retaining wheels, indicated as made of rubber in this view, is shown in longitudinal section.
Figure 8:
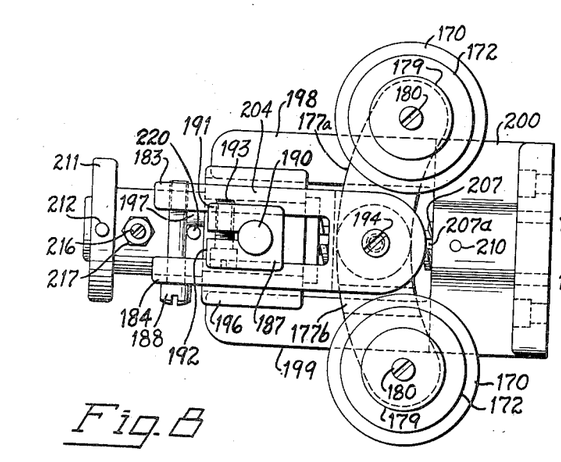
Fig. 8 is a plan view of the work clamp looking in the direction of arrow 8 of Fig. 7.
Figure 9:
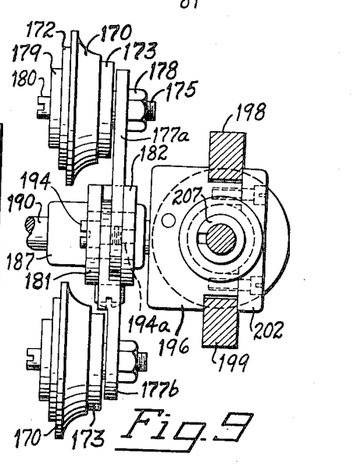
Fig. 9 is a fragmentary sectional view taken on the line 9—9 of Fig. 7.

The bracket 204 is adjustable horizontally by providing it with clamping arms 183 and 184 which are parallel and which slide in parallel grooves 185 and 186 respectively provided by a sleeve 187 as shown in Figs. 5 and 6. A screw 188 passing through a plain hole in the arm 184 and threadedly engaging the arm 183 as shown in Figs. 5 and 8 clamps the bracket 204 in adjusted position horizontally with respect to the sleeve 187.

The sleeve 187 is adjustable vertically upon a rod 190, the sleeve 187 being split to provide clamp arms 191 and 192. Screw 193 passes through a plain hole in the clamp arm 192 and is threaded into a hole tapped into the clamp arm 191. By loosening the screw 193 the sleeve 187 may be adjusted vertically and then clamped into position on the rod 190 by tightening the screw 193.

The rod 190 is received by a vertical bore 195 provided by a block 196 and is secured therein by a pin 197. The block 196 is supported for horizontal movement only upon horizontal guide bars 198 and 199 which extend from a bracket 200 attached by screws 201 to the cradle 61, the block 196 being retained into position by a plate 202 attached by screws 203 to the block 196. The block 196 and plate 202 provide jointly an internal cylindrical bore 205 which provides a journal supporting a rotatable sleeve 206 which rotates around a non-rotatable screw 207 having its right end, as shown in Fig. 7, provided with a non-threaded portion 208 received by an apertured lug 209 provided by the bracket 200. A pin 210 passes through the lug 209 and the non-threaded end 208 of the screw 207 to secure the screw to the bracket 200. The sleeve 206, being supported by the block 196 and plate 202 serves also to support the screw 207. The sleeve 206 is provided at its left end with a flange 211 from which extend rods 212 to facilitate turning the sleeve 206. The sleeve 206 is prevented from being removed from the screw 207 by a washer 213 attached by screw 214 to the screw 207. The thread of screw 207 is not a continuous thread, but every convolution is interrupted by notch 207a thus providing in effect a longitudinal groove along the upper side of the screw 207. This groove provided by the horizontally aligned notches 207a intercepts each convolution of the thread of the screw 207. A screw 216 is threaded through sleeve 206 and is secured in adjusted position by a nut 217. Screw 216 has a plain cylindrical end 215 less in diameter than the width of notches 207a. This screw end 215 is intended to cooperate with a certain convolution of the screw threads 207, the particular convolution depending on how far the work retaining rollers 170 must be pushed before they engage the work piece A. This distance, of course, depends on the size of the work piece. As stated before, the machine is adapted to take various sizes and shapes of work pieces and work holders; but the same work securing device is used with various work holders.

To release the rollers 170 from work retaining position as shown in Fig. 1 or as shown with 170a in Fig. 7, the operator turns the sleeve 206 in such position that the screw end 215 will be in alignment with the thread notches 207a, thereby permitting the sleeve 206 to be moved toward the left along the screw 207 without the threads thereof being engaged by screw end 215. In order to bring the screw end 215 into alignment with the thread notches 207a, the sleeve 206 is turned in such direction as to cause a pin 220 carried thereby to be brought into substantially vertical position on the right hand side of the pin 197 which extends from the block 196 (right hand as viewed from the front of the machine).

After a new work piece has been placed upon the block 60, the sleeve 206 is pushed away from the operator so as to bring the rubber rollers 170 into engagement with the work piece. The rollers are pressed gently against the work piece, just sufficiently to bring the screw end 215 into one of the spiral grooves between adjacent convolutions of the threads of the screw 207. Then the sleeve 206 is turned clockwise as viewed from the front of the machine so as to cause the sleeve 206 to be advanced by the screw thread camming action of screw end 215 along the screw 207, thereby causing the soft rubber rollers 170 to effect a firm but yielding clamping pressure upon the work piece A to hold it in position upon the work holder 60. The sleeve 206 may be turned by the handle rods 212 sufficiently to cause the pin 220 to engage the left hand side of the pin 197 (left hand as viewed from the front of the machine). The engagement of the pin 220 with the left hand side of the pin 197 prevents turning the sleeve into such position as to cause the screw end 215 to be aligned with the thread notches 207a.

The work retaining device is provided with all of the adjustments which are necessary to accommodate it to various sizes and pieces of work within reasonable limits. The screw 194 provides means for securing the rollers 170 in the desired spaced relation. The screw 188 cooperating with the split bracket 204 provides for the horizontal adjustment of the roller with respect to the sleeve 196. The screw 193 and the split bracket 187 provide for the vertical adjustment of the rollers with respect to the block 196. Each convolution of the thread of the screw 207 provides in cooperation with the screw end 215 a means for camming the block 196, and hence the rollers 170, into a work clamping position. Obviously, any one of the several of the interrupted thread portions of the screw 207 may be selected as the camming means depending on the diameter of the work piece. Quite obviously, the screw 207 could be made longer than shown in the drawings if it were necessary to accommodate the work clamping means to a larger number of positions in which the rollers 170 could be clamped in engagement with the work.

The labor required to unload and reload the work holders of a gang of buffing units disclosed herein has been greatly facilitated by providing a simple and conveniently operated device for releasing the buffing wheels and the work retaining means. All that is required is that the operator turn off the supply of current to the motor which operates the gang of buffing wheel units. This is done in the usual way by pressing a button which controls the starting of the motor. Then the operator presses on the lever handles 145 to permit the release of all of the buffing wheel frames. Then he releases all of the clamping sleeves 206 by turning the handle rods 212 in a counterclockwise direction as viewed from the front. The sleeves 206 automatically move away from clamping position due to the expansion of the rubber rollers 170. After replacing the polished work pieces with unpolished ones, the operator reverses the manipulations by pushing in the sleeves 206 until the rollers 170 lightly engage the work pieces. Then he turns the handle rods 212 clockwise as far as they will go. Then the operator starts the motor to effect rotation of the buffing wheels and work pieces, and pulls down on the handle bars 30 to bring the buffing wheels into engagement with the work pieces. While these manipulations are taking place, another gang of buffing wheels under the care of the operator is doing its work. The operator obviously may proceed from one gang of wheels to the other and then back again.

While the embodiment of the present invention as herein disclosed, constitutes a preferred form, it is to be understood that other forms might be adopted, all coming within the scope of the claims which follow.

What is claimed is as follows:

1. Buffing equipment comprising a combination, a main drive shaft, a buffing wheel frame pivotedly supported coaxially of the drive shaft, a buffing wheel shaft mounted upon the frame parallel to the drive shaft and carrying a plurality of buffing wheels, means for transmitting motion from the main drive shaft to the buffing wheel shaft, a work holder associated with each buffing wheel, means for normally holding the wheels from the work holders, releasable means for holding the wheels into engagement with the work, a device for rotatably supporting each work holder, shafts extending transversely to the buffing wheel shaft each for rotating a work holder, a common shaft parallel to the buffing wheel shaft for driving all of the work holder shafts, means for oscillatably supporting each of the work holder supporting devices, a common mechanism operated by the work holder common drive shaft for oscillating all of the work holder supporting devices while the work holders are rotating, means for transmitting motion from the main drive shaft to said work holder common drive shaft, and means for automatically rendering the releasable means inoperative when the buffing wheels are worn down to a certain diameter.

2. Buffing equipment comprising in combination, a plurality of coaxially supported rotatable buffing wheels, a work holder associated with each buffing wheel, means for normally holding the buffing wheels from the work holders, latch means operable to hold the buffing wheels into engagement with the work, a device for rotatably supporting each work holder, means for oscillatably supported each work holder supporting device, a shaft for rotating each work holder, a common shaft for driving all of the work holder shafts, a common mechanism operated by the work holder driving shaft for oscillating all of the work holder supporting devices while said devices are rotated, and means for automatically rendering the releasable means inoperative when the buffing wheels are worn down to a certain diameter.

3. Buffing equipment comprising in combination, a plurality of coaxially supported rotatable buffing wheels, a work holder associated with each buffing wheel, means for normally holding the buffing wheels from the work holders, latch means operable to hold the buffing wheels into engagement with the work, a device for rotatably supporting each work holder, means for oscillatably supporting each work holder supporting device, means for rotating the work holders, a common mechanism operated by the work holder rotating means for oscillating all of the work holder supporting devices when said devices are rotated and means for rendering the latching means inoperative when the buffing wheel has been worn down sufficiently.

4. Buffing equipment comprising in combination, a plurality of coaxially supported buffing wheels, a work holder associated with each buffing wheel, means for normally holding the buffing wheels from the work holders, latch means operable to hold the buffing wheels into engagement with the work, a device for rotatably supporting each work holder, means for oscillatably supporting each work holder supporting device, means for rotating the work holders, an oscillating lever actuated by the work holder rotating means, a common mechanism associated with the oscillating lever and with each of the work holders whereby a swinging movement is imparted simultaneously to all of the work holders when said work holders are rotated; and means for automatically releasing the holding means when the buffing wheel is worn down a predetermined amount.

5. Buffing equipment comprising in combination, a plurality of coaxially supported buffing wheels, a work holder associated with each buffing wheel, means for normally holding the buffing wheels from the work holders, latch means operable to hold the buffing wheels into engagement with the work, a device for rotatably supporting each work holder, means for oscillatably supporting each work holder supporting device, means for rotating the work holders, an oscillating lever actuated by the work holder rotating means, an arm for oscillating each work holder supporting device, a bar connected with the oscillating lever and each of said arms whereby the work holders are oscillated simultaneously during rotation of the work holders and means for rendering the latch means ineffective when the buffing wheel is worn down a certain amount.

6. Buffing equipment comprising in combination a plurality of coaxially supported buffing wheels, a work holder associated with each buffing wheel, means for normally holding the buffing wheels from the work holders, latch means operable to hold the buffing wheels into engagement with the work, a device for rotatably supporting each work holder, means for oscillatably supporting each work holder supporting device, a shaft for rotating each work holder, a common shaft for driving all of the work holder shafts, an oscillating lever actuated by the work holder common drive shaft, a common mechanism associated with the oscillating lever and with each of the work holders whereby swinging movement is imparted simultaneously to all of the work holders during rotation of the work holders and means for rendering the latch means inoperative after the buffing wheel is worn down to a predetermined diameter.

7. Buffing equipment comprising in combination a plurality of coaxially supported buffing wheels, a work holder associated with each buffing wheel, a device for rotatably supporting each work holder, means for oscillatably supporting each work holder supporting device, a shaft supported adjacent each work holder, a universal joint connecting a common shaft for driving all of the stud shafts, an oscillating lever actuated by the work holder common drive shaft, an arm for oscillating each work holder supporting device, and a bar extending parallel to the work holder common driving shaft and connected with the oscillating lever and each of said arms whereby the work holders are oscillated simultaneously.

8. Buffing equipment comprising in combination, a rotatable buffing wheel, a work holder associated with the buffing wheel, means for holding the wheel against the work, a cradle for rotatably supporting the work holder, means for pivotedly supporting the cradle for oscillating about an axis transverse to the axis of rotation of the work holder, means for oscillating the work holder cradle, means for rotating the work holder while providing for oscillation thereof, said work holder rotating means including a shaft section having a spline connection with the work holder whereby the work holder may be easily removed from its cradle and means for automatically rendering the holding means ineffective when the buffing wheel is below a predetermined diameter.

9. Buffing equipment comprising in combination, a rotatable buffing wheel, a workholder associated with the buffing wheel, means for holding the buffing wheel against the work holder, a cradle for rotatably supporting the work holder, means for pivotally supporting the cradle for oscillation about an axis transverse to the axis of rotation of the work holder, means for oscillating the work holder cradle, and a sectional shaft for rotating the work holder, said sectional shaft including a non-oscillatable section, an oscillatable section having a spline connection with the work holder to facilitate removal of the latter from its cradle and a universal joint connecting the two sections and located coaxially with respect to the axis of the oscillation of the work holder cradle.

10. Buffing equipment comprising in combination, a rotatable buffing wheel, a rotatable work holder associated with the buffing wheel, a counterweighted arm for supporting the buffing wheel and for normally holding the wheel away from the work holder, a table for supporting the work holder, means for latching the arm to the work holder table in operating position and means for automatically releasing the latching means when the buffing wheel is worn down to a certain diameter.

11. Buffing equipment comprising in combination, a rotatable buffing wheel, a rotatable work holder associated with the buffing wheel, a counterweighted arm for supporting the buffing wheel and for normally holding the wheel away from the work, a table for supporting the work holder, a latch bar member and a cooperating latch lever member, one of said members being carried by the arm and the other supported by the table.

12. Buffing equipment according to claim 11 and having adjustable means for supporting a latch member at varying distances from the table.

13. Buffing equipment according to claim 11 in which the latch lever is carried by a support which is adjustable to various distances from the table.

14. Buffing equipment comprising in combination, a rotatable buffing wheel, a bearing member for rotatably supporting any one of a plurality of work holders for presenting various sizes and shapes of work to the buffing wheel, a rotatable member for engaging the work upon the work holder, adjustable means for supporting said rotatable member said adjustable means providing for adjustment of said member in directions parallel to and transversely to the axis of the work holder whereby to accommodate the rotatable member to various sizes and shapes of work holders, means for clamping said rotatable member in position against the work placed upon the work holder, and means for oscillating the work holder upon rotation thereof.

15. Buffing equipment comprising in combination, a rotatable buffing wheel, a bearing member for rotatably supporting any one of a plurality of work holders for presenting various sizes and shapes of work to the buffing wheel, a rotatable member for engaging the work upon the work holder, a block carrying said rotatable member, guides for supporting the block for sliding movement transversely to the axis of rotation of the work holder, and means for securing the rotatable member against the work piece on the work holder, said securing means being adaptable to various sizes of work holders and including provisions whereby the block may be clamped in any one of several positions along its supporting guides.

16. Buffing equipment comprising in combination, a rotatable buffing wheel, a bearing member for rotatably supporting any one of a plurality of work holders for presenting various sizes and shapes of work to the buffing wheel, a rotatable member for engaging the work upon the work holder, a block carrying said rotatable member, guides for supporting the block for sliding movement transversely to the axis of rotation of the work holder, and means for securing the rotatable member against the work piece on the work holder, said securing means being adaptable to various sizes of work holders and including a fixed member carrying a plurality of camming surfaces spaced at various distances from the work holder bearing member and including a member rotatably attached to the block and adapted to be engaged with any one of said camming surfaces.

17. Buffing equipment comprising in combination, a rotatable buffing wheel, a bearing member for rotatably supporting any one of a plurality of work holders for presenting various sizes and shapes of work to the buffing wheel, a rotatable member for engaging the work upon the work holder, a block carrying said rotatable member, guides for supporting the block for sliding movement transversely to the axis of rotation of the work holder, and means for securing the rotatable member against the work piece on the work holder, said securing means being adapted to various sizes of work holders and including a fixed rod carrying a screw thread, and said securing means including a member rotatably attached to the block and adapted to cooperate with various portions of said screw thread.

18. Buffing equipment comprising in combination, a rotatable buffing wheel, a bearing member for rotatably supporting any one of a plurality of work holders for presenting various sizes and shapes of work to the buffing wheel, a rotatable member for engaging the work upon the work holder, a block carrying said rotatable member, guides for supporting the block for sliding movement transversely to the axis of rotation of the work holder, and means for securing the rotatable member against the work piece on the work holder, said securing means being adaptable to various sizes of work holders and including a fixed rod carrying a screw thread interrupted by longitudinally aligned notches, each of said thread portions providing a camming surface, and said securing means including a sleeve rotatively fixed to said block and surrounding said screw thread and having a pin adapted to cooperate with any of said screw thread portions, said pin being of such diameter as to pass thru the notches which interrupt the screw thread.

19. Buffing equipment comprising in combination, a rotatable buffing wheel, a rotatable work holder associated with the buffing wheel, a counterweighted arm for supporting the buffing wheel and for normally holding the wheel away from the work, a table for supporting the work holder, latching mechanism for holding the buffing wheel into engagement with a piece of work on the workholder so long as the diameter of the buffing wheel is above a predetermined dimension, means for adjusting the latching means in accordance with the wear of the buffing wheels, and provisions provided on the arm and the latching mechanism to render the latching mechanism inoperative after the diameter of the buffing wheel is worn below the predetermined dimension.

20. Buffing equipment comprising in combination, a rotatable buffing wheel, a rotatable work holder associated with the buffing wheel, a counterweighted arm for supporting the buffing wheel and for normally holding the wheel away from the work, a table for supporting the work holder, a latch bar member and a cooperating lever member, for holding the wheel against a piece of work one of the members being carried by the arm and the other supported by the table, adjustable means for supporting the lever at various distances from the table, means for limiting the movement of the lever toward the table, and means operable only when the latch member is in its limited adjusted position to prevent the lever from engaging the latch bar when the wear of the buffing wheel has reached the predetermined amount.

21. Buffing equipment comprising in combination, a main drive shaft, a buffing wheel pivotally supported upon the drive shaft, a holder for a piece of work, means for normally holding the buffing wheel from the work, means for holding the buffing wheel into engagement with the work when the diameter of the buffing wheel is above a predetermined dimension, power means for rotating the buffing wheel and for moving the holder simultaneously, and means for rendering the holding means inoperative after the diameter of the buffing wheel is worn below the predetermined dimension.

22. Buffing equipment comprising in combination, a main drive shaft, a buffing wheel pivotally supported upon the drive shaft, a holder for a piece of work, means for normally holding the buffing wheel from the work, means for holding the buffing wheel into engagement with the work when the diameter of the buffing wheel is above a predetermined dimension, power means for rotating the buffing wheel and the holder simultaneously, means for oscillating the holder while the piece of work is being acted upon by the buffing wheel, and means adapted to render the holding means inoperative when the buffing wheel is worn below the predetermined diameter.

23. Buffing equipment comprising in combination, a main drive shaft, a frame pivotally supported coaxially of the main drive shaft, a buffing wheel shaft mounted upon the frame parallel to the main drive shaft and carrying a plurality of buffing wheels, a belt for transmitting motion from the main drive shaft to the buffing wheel shaft, a work holder associated with each buffing wheel; means for rotating each work holder, means for normally holding the frame in inoperative positon; means for holding the frame into operative position; means for adjusting the holding means in accordance with the wear of the buffing wheel, means for limiting the adjustment of the holding means; and means adapted to be engaged by the belt for tripping the holding means when the buffing wheel is worn below a certain diameter to permit the frame to return to its inoperative position.

24. In a buffing machine the combination of a pivoted supporting frame; a buffing wheel carried by the frame; means for normally holding the frame in an inoperative position; latch means for holding the frame into an operative position; means for adjusting the latch position in accordance with the wear of the buffing wheel; stop means for limiting the number of adjusted positions of the latch means; and means adapted to engage the latch means in its final adjusted position to render same inoperative when the wear on buffing wheel reduces the diameter of the wheel to a predetermined dimension.

GEORGE C. BLAKE.
PERCIVAL C. SMITH.